United States Patent [19]

Nathan

[11] 3,768,633
[45] Oct. 30, 1973

[54] CONTACT LENS CASE
[75] Inventor: David L. Nathan, Maplewood, N.J.
[73] Assignee: Opticase, Inc., Rockaway, N.J.
[22] Filed: Jan. 3, 1972
[21] Appl. No.: 214,678

[52] U.S. Cl................ 206/5 A, 220/31 S, 220/38.5
[51] Int. Cl........................ A45c 11/00, B65d 85/30
[58] Field of Search ................... 206/5 A; 220/31 S, 220/60 R, 38.5; 215/99

[56] References Cited
UNITED STATES PATENTS
3,394,717   7/1968   Hollinger ........................... 206/5 A
3,256,892   6/1966   Esposito, Jr. ...................... 220/31 S Primary Examiner—William T. Dixson, Jr.
Attorney—Rudolph J. Jurick

[57] ABSTRACT

A contact lens case comprising a lens-supporting platform, a cylindrical member and a cap, the cylindrical member being positionable over the platform to form a chamber for liquid, and the cap being positionable over the cylindrical member to close the chamber.

6 Claims, 10 Drawing Figures

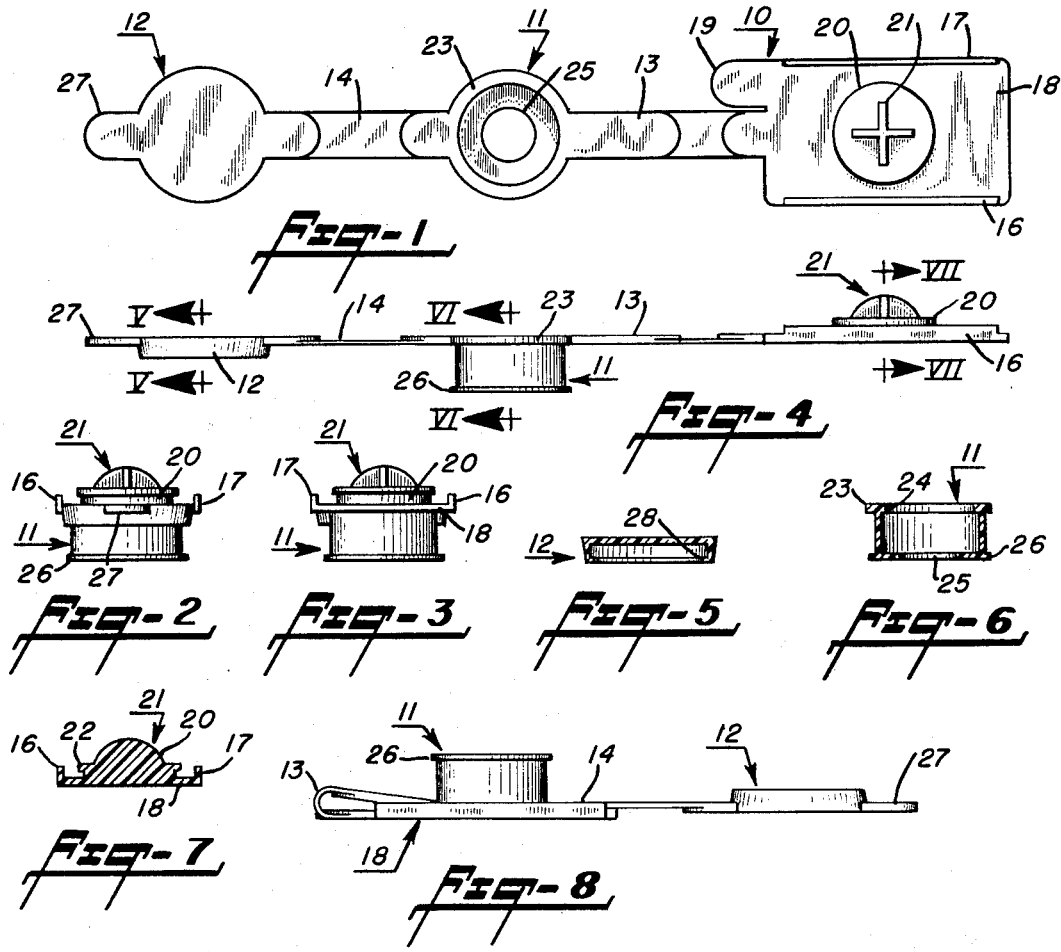
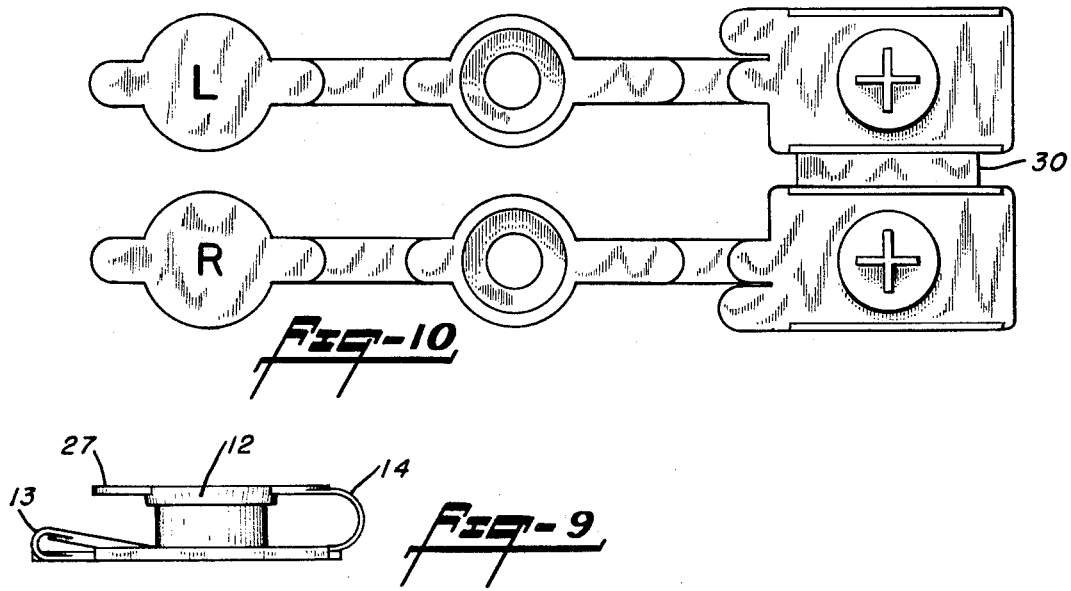

CONTACT LENS CASE

BACKGROUND OF THE INVENTION

The invention relates to a case for storing a contact lens when not in use. During periods of non-use, it is desirable to maintain contact lenses immersed in a suitable soaking solution. Contact lens cases of various constructions are known in the art but these suffer from various shortcomings. In general, the prior cases are of relatively expensive construction and, in some instances, the case is so constructed that it is difficult for the user to remove the lens, thereby increasing the possibility of scratching the lens surface. Furthermore, the prior contact lens cases are constructed in such manner that the soaking solution is retained in a chamber and may be used over and over again, until such time that the user decides to replace it with a fresh solution. This is particularly objectionable in the case of the new soft contact lenses which require a much higher degree of asepsis than do the conventional corneal lenses. Apart from the normal use of soft contact lenses, such lenses also are prescribed for temporary use following surgical operations.

A contact lens case made in accordance with this invention is of simple, inexpensive construction and prevents a re-use of the soaking solution, whereby the case is particularly adapted for use with soft contact lenses to compel the user to maintain the necessarily higher state of cleanliness.

SUMMARY OF THE INVENTION

The contact lens case comprises a lens-supporting member, a cylindrical member and a cap. The cylindrical member has an open end, the other end being closed by a wall having a hole extending therethrough, which hole is smaller than the lens. The open end of the cylindrical member is attachable to the lens supporting member to form a chamber for containing the lens immersed in a soaking solution and the cap is attachable to the other end of the cylindrical member to close the chamber. In one embodiment of the invention, the three members which form the case are connected together by flexible strap portions. By bending one of the strap portions back upon itself one end of the cylindrical member is positionable over the lens-supporting member and fastened thereto. By bending the other strap portion back upon itself the cap is positionable over the other end of the cylindrical member and fastened thereto. In order to remove the contact lens from the case it is necessary to unfasten the cylindrical member from the lens-supporting member, thereby spilling the soaking solution.

An object of this invention is the provision of a contact lens case particularly adapted for use with soft contact lenses.

An object of this invention is the provision of a contact lens case for containing a contact lens immersed in a liquid, which case cannot be opened for the removal of the lens without spilling the solution.

An object of this invention is the provision of a contact lens case comprising a unitary assemblage made of a flexible plastic, which assemblage comprises a lens-supporting member, a cylindrical member and a cap connected together by flexible strap portions, said cap and lens-supporting member being attachable to opposite ends of the cylindrical member to form a liquid-tight chamber for containing a contact lens immersed in a liquid.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views;

FIG. 1 is a top plan view of a contact lens case made in accordance with one embodiment of this invention, the case being shown in the fully open position;

FIG. 2 is a left end elevational view thereof;

FIG. 3 is a right end elevational view thereof;

FIG. 4 is a side elevational view thereof;

FIG. 5 is a cross-sectional view taken along the line V—V of FIG. 4;

FIG. 6 is a cross-sectional view taken along the line VI — VI of FIG. 4;

FIG. 7 is a cross-sectional view taken along the line VII — VII of FIG. 4;

FIG. 8 is a side elevational view showing the case in the partially closed position;

FIG. 9 is a corresponding view but showing the case in the fully closed position; and FIG. 10 is a top plan view showing a duplex case made in accordance with another embodiment of the invention.

DESCRIPTION OF PREFERRED EMBODIMENTS

Referring now to FIGS. 1 – 4, a contact lens case made in accordance with one embodiment of this invention comprises a unitary assemblage made of a flexible plastic, such as polyethylene, and includes a lens-receiving portion 10, a cylindrical member 11 and a cap 12, these parts being joined together by the relatively narrow strap portions 13 and 14. The lens-receiving portion is of a generally rectangular configuration having side walls 16 and 17, extending upwardly from a flat base 18, a flat tab 19 and a circular lens-supporting platform 20. Extending upwardly from this platform is lens positioner 21 formed of four arms disposed at right angles to each other, said arms having convex end walls resulting in a dome-like configuration when viewed in elevation from any angle. The platform 20 is undercut (FIG. 8) to form an external circular lip 22. The cylindrical member 11 has a relatively wide external flange 23 and a relatively narrow internal lip 24 formed at one end thereof. The other end of the cylindrical member is closed except for the hole 25, which hole is smaller than a contact lens. This other end of the cylindrical member also includes an external lip 26. The cap 12 has a pull tab 27 extending from the closed bottom thereof, that is, the tab is generally co-planar with the strap portions 13 and 14 when the case is in the fully open position. An internal lip 28 (FIG. 5) is formed at the open end of the cap.

In use, a contact lens is placed upon the platform 20, in the inverted position. The flexible strap portion 13 now is bent back upon itself to position the cylindrical member 11 over the platform 20 and the lens, after which the cylindrical member is pressed downward firmly until it snaps into place, the internal lip 24 on the cylindrical member and the external lip 22 on the platform cooperating to provide the snap action. With the cylindrical member snapped into place, as shown in FIG. 8, the external flange 23 of the cylindrical member, (FIG. 6) is pressed firmly against the flat base 18 of the lens-receiving portion 10, (FIG. 3), thereby forming a fluid-tight chamber except for the opening 25 formed in the bottom wall of the cylindrical member. This opening now overlies the contact lens and the axial length of the cylindrical member is such that the chamber will hold a specific amount of liquid. The user now fills the chamber with a suitable aqueous solution, bends the strap portion 14 back upon itself and snaps the cover 12 over the cylindrical member, such snap action being provided by the external flange 26 on the cylindrical member, (FIG. 6) and the internal lip 28 formed in the cap, (FIG. 5). FIG. 9 shows the lens case in the fully-closed postion, it being apparent that the contact lens is immersed in the solution contained in a liquid-tight chamber. It is here pointed out that the two strap portions 13 and 14 include sections of a reduced thickness, as visible in FIG. 4, thereby to facilitate the bending of the strap portions to position the cylindrical member over the lens supporting platform and to position the cap over the cylindrical member. To remove the contact lens, the user grasps the tab 27 and pries the cap from the cylindrical member. By grasping the cap, the user now pries the cylindrical member from the platform, preferably over a sink. Alternatively, the lens case may be placed upon a flat surface of the sink and held in place by finger pressure applied to the tab 19 while the described operation of removing the lens from the case is performed by the other hand. Since the hole in the wall of the cylindrical member is smaller than the lens it is apparent that the lens cannot be removed from the case without spilling the soaking solution. Hence, the lens case is particularly adapted for use with soft contact lenses which require a much higher degree of asepsis than do the conventional corneal lenses.

The cap 12, of the lens case, may carry a suitable marking, such as the letter L or R, denoting Left or Right eye, thereby to maintain the necessary identity of the particular lens. Two separate cases may be used for a pair of lenses or, as shown in FIG. 10, the two cases may be joined together by a web 30 and formed in a single molding operation.

The described unitary assemblage of the lens-supporting member, cylindrical member and cap is advantageous as these parts cannot become separated and lost. However, the case can be made of three separate and distinct parts and the liquid-tight chamber can be formed by cooperating threaded portions formed on the parts.

Having now described the invention what I desire to protect by Letters Patent is set forth in the following claims.

I claim:

1. A contact lens case comprising,
   a. a cylindrical member having an open end, the other end being closed by a wall having a hole extending therethrough, which hole is smaller than the lens,
   b. a circular platform for supporting the lens and connected to the cylindrical member by a first flexible strap, said platform being adapted for insertion into the open end of the cylindrical member to form a container,
   c. a cap connected to the cylindrical member by a second flexible strap, said cap being adapted for insertion over the other end of the cylindrical member to close said container,
   d. first means for attaching the cylindrical member to the platform, and
   e. second means for attaching the cap to the cylindrical member.

2. The invention as recited in claim 1, wherein the lens case is made of a flexible plastic; wherein the said first means comprises a circular lip on said platform and an internal circular lip at the said one end of the cylindrical member, said lips cooperating to provide a snap action; and wherein the said second means comprises an internal circular lip on the cap and an external circular lip at the said other end of the cylindrical member, said lips cooperating to provide a snap action.

3. The invention as recited in claim 2, wherein each of the flexible straps has a central portion of reduced thickness.

4. The invention as recited in claim 2, wherein the said platform extends from a flat base and wherein the cylindrical member includes an external flange at the said one end thereof, said flange being pressed against said base when the cylindrical member is attached to the said platform.

5. The invention as recited in claim 4, including a pull tab extending from said cap.

6. The invention as recited in claim 5, including lens-positioning means extending from the said platform, said lens-positioning means preventing lateral displacement of a contact lens beyond the periphery of the said circular platform.

* * * * *